(12) United States Patent
Feller

(10) Patent No.: US 7,961,818 B2
(45) Date of Patent: Jun. 14, 2011

(54) METHOD AND SYSTEM FOR ADAPTIVE TIMING RECOVERY

(75) Inventor: Marc Feller, Long Beach, CA (US)

(73) Assignee: Quantum Corporation, San Jose, CA (US)

( * ) Notice: Subject to any disclaimer, the term of this patent is extended or adjusted under 35 U.S.C. 154(b) by 703 days.

(21) Appl. No.: 12/024,807

(22) Filed: Feb. 1, 2008

(65) Prior Publication Data

US 2009/0195906 A1     Aug. 6, 2009

(51) Int. Cl.
*H04L 27/14* (2006.01)
(52) U.S. Cl. ...................................... 375/326
(58) Field of Classification Search .......... 375/326, 375/327, 371–376
See application file for complete search history.

(56) References Cited

U.S. PATENT DOCUMENTS 5,999,355 A * 12/1999 Behrens et al. ............... 360/65

* cited by examiner

*Primary Examiner* — Kevin Y Kim
(74) *Attorney, Agent, or Firm* — Baker Botts L.L.P.

(57) ABSTRACT

Timing recovery in partial-response-based magnetic recording systems customarily employs the "decision-directed" method wherein phase error is recovered from the differences between the noise-corrupted received signal samples and their estimated ideal (noise and phase error free) values. The filtered phase error drives a numerically-controlled oscillator which determines the instants at which the signal is resampled, attempting to place said instants at the ideal sampling times. The resampled signal contains errors due to mistiming as well as to the original corrupting noise, and these errors directly influence the success of subsequent detection. However, the noise can be reduced using adaptive linear prediction, having the effect of reducing the output error for a given noise input, or maintaining the same error for a larger noise input.

24 Claims, 6 Drawing Sheets

METHOD AND SYSTEM FOR ADAPTIVE TIMING RECOVERY

TECHNICAL FIELD

The present invention relates to timing recovery, and more particularly, some embodiments relate to timing recovery using adaptive noise prediction.

DESCRIPTION OF THE RELATED ART

The recording density in magnetic recording devices has been steadily increasing over the past several decades. Space between individual data structures in parallel recording is fast approaching its minimum limit as the minimum width of a magnetic medium required to retain readable magnetic signatures is becoming equivalent to the width of the data structure itself. With the recent introduction of perpendicular or anti-parallel magnetic recording, the width of each individual data structure is now even smaller and may be narrower than the minimum width found in previous parallel recording systems. As the width of each data structure decreases, it becomes apparent that the timing recovery operation of a data read circuit must become more accurate.

Timing recovery, also referred to as bit synchronization or clock recovery, is a process that emulates the system clock of the receiver to the symbol rate of the incoming data stream. In general, data are being transmitted without the transmitter clock signal information. Thus, the receiver uses a timing recovery circuit to recover or extract the clock information from the incoming data stream in order to properly read the data. Obtaining the correct clock information is essential as it allows the receiver to distinguish the data constituents of the incoming data stream.

BRIEF SUMMARY OF EMBODIMENTS OF THE INVENTION

According to various embodiments of the invention, a timing recovery circuit is provided. The timing recovery circuit includes: an interpolator configured to generate an interpolated signal; an estimator configured to generate a first output signal based on the interpolated signal; and a noise prediction filter configured to generate a compensation signal based on interpolated signal and the first output signal.

In one embodiment, the timing recovery circuit includes: a first mixer configured to mix the interpolated signal with the first output signal and to output the mixed signal to the noise prediction filter; and a second mixer configured to mix the compensation signal with the interpolated signal to generate the timing recovery circuit output signal.

In yet another embodiment, the timing recovery circuit includes: a phase detector configured to detect a phase error based on the first output signal and the interpolated signal; a loop filter configured to filter a phase detector output signal and to output a filtered signal; and an oscillator configured to generate a gate signal and a offset signal based on the filtered signal from the loop filter.

In still another embodiment, the noise prediction filter comprises an adaptive nonrecursive finite impulse response filter.

In yet another embodiment, the nonrecursive finite impulse response filter has a plurality of filter taps, each filter tap value is determined using a lookup table.

In still another embodiment, the nonrecursive finite impulse response filter has a plurality of filter taps, each filter tap value being determined using an adaptive algorithm. The adaptive algorithm may comprise a Widrow-Hoff LMS algorithm, recursive least squares (RLS), fast RLS, or an adaptive lattice algorithm.

In still another embodiment, the nonrecursive finite impulse response (FIR) filter is configured to drive a difference between an input of the FIR filter and an output of the FIR filter to zero.

In yet another embodiment, first output signal comprises an estimation signal configured to determine the nearest ideal signal value to sample.

In another embodiment of the present invention, a method for correcting phase error between an interpolated sample time and an ideal interpolated sample time of a waveform is provided. The method comprises: generating an interpolated sample time; generating an estimation signal based on the interpolated sample time; generating an error compensation signal based on interpolated signal and the estimation signal; and subtracting the error compensation signal from the interpolated sample time.

In still another embodiment, wherein the estimation signal is used to determine the nearest ideal signal value to sample.

In still another embodiment, the method further includes: mixing the interpolated signal with the estimation signal, wherein the error compensation signal is generated using the mixed signal; mixing the error compensation signal with the interpolated signal to obtain a second mixed signal, wherein the second mixed signal is used to the estimation signal.

In still another embodiment, the method includes determining a phase error based on the estimation signal and the interpolated signal; filtering the determined phase error; and generating a gate signal and a offset signal based on the filtered phase error, wherein the gate signal and the offset signal are used to generate the interpolated signal in subsequent cycle.

In yet another embodiment, the error compensation signal is generated using an adaptive nonrecursive finite impulse response filter.

In yet another embodiment, the adaptive nonrecursive finite impulse response filter has a plurality of filter taps, each filter tap value is determined using a lookup table or using an adaptive algorithm.

In yet another embodiment, the adaptive algorithm comprises a Widrow-Hoff LMS algorithm, recursive least squares (RLS), fast RLS, or an adaptive lattice algorithm.

In yet another embodiment, wherein the nonrecursive finite impulse response (FIR) filter is configured to drive a difference between an input of the FIR filter and an output of the FIR filter to zero.

In another embodiment of the present invention, a timing recovery system comprises: means for generating an interpolated sample time; means for generating an estimation signal based on the interpolated sample time, wherein the estimation signal is configured to determine the nearest ideal signal value to sample; means for generating an error compensation signal based on interpolated signal and the estimation signal; and means for subtracting the error compensation signal from the interpolated sample time.

In still another embodiment, the system further includes: means for mixing the interpolated signal with the estimation signal, wherein the error compensation signal is generated using the mixed signal; means for mixing the error compensation signal with the interpolated signal to obtain a second mixed signal, wherein the second mixed signal is used to the estimation signal.

In still another embodiment, the system further includes: means for determining a phase error based on the estimation signal and the interpolated signal; means for filtering the determined phase error; and means for generating a gate signal and a offset signal based on the filtered phase error, wherein the gate signal and the offset signal are used to generate the interpolated signal in subsequent cycle.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for adaptive timing recovery. The timing recovery process in partial-response-based magnetic recording systems customarily employs the "decision-directed" method wherein the phase error is recovered from the differences between the noise-corrupted signal samples and their estimated ideal (noise and phase error free) values. The filtered phase error drives a numerically-controlled oscillator which determines the instants at which the signal is resampled by attempting to place the instants at the ideal sampling times. The resampled signal contains errors due to mistiming as well as to the original noise, and these errors directly influence the success of subsequent detection. However, using adaptive linear prediction according to embodiments of the present invention, the noise can be reduced.

Figure 1:
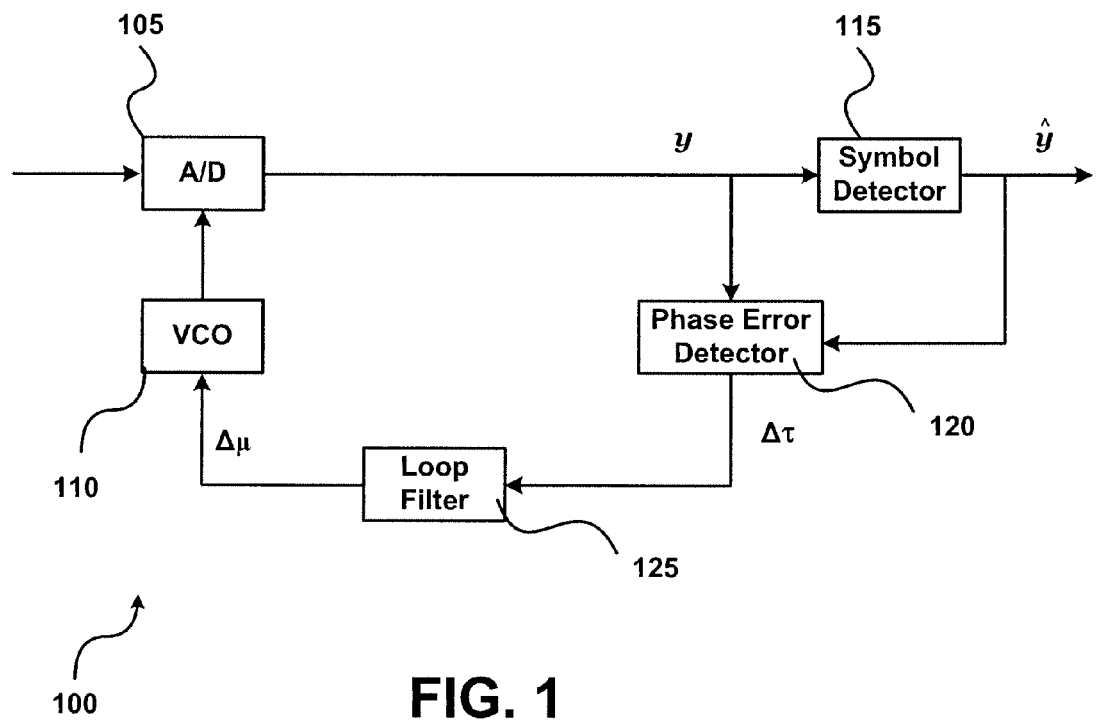
FIG. 1 illustrates an example timing recovery circuit.

Before describing the invention in detail, it is useful to describe an example timing recovery system. FIG. 1 illustrates an example symbol rate timing recovery system 100. Referring now to FIG. 1, system 100 includes an analog to digital converter (ADC) 105, a voltage control oscillator (VCO) 110, a symbol detector 115, a phase error detector error 120, and a loop filter 125. Generally, in system 100, the timing recovery process is accomplished by first oversampling the incoming data signal using ADC 105 with a signal generated by VCO 110. In system 100, VCO 110, phase error detector 120 and loop filter 125 together form a phase locked loop (PPL) that adjusts the phase and frequency of VCO 110. This adjustment is done at each cycle. As such, the above system is referred to as a symbol rate timing recovery system because the phase and frequency of VCO 110 is locked to the phase and frequency of the incoming data, which is defined by the training sequence in the data preamble.

Figure 2:
FIG. 2 illustrates an example data sector of a magnetic storage medium.

FIG. 2 illustrates an example data sector 200 that comprises a preamble portion 205, a sync portion 210, and a data portion 215. Preamble portion 205 includes a training sequence that provides the receiver information to adjust the frequency and phase of the receiver's system clock. This allows the read channel to properly read the incoming data stream. Sync portion 210 is used to indicate the end of preamble portion 205 and the beginning of data portion 215.

Figure 3:
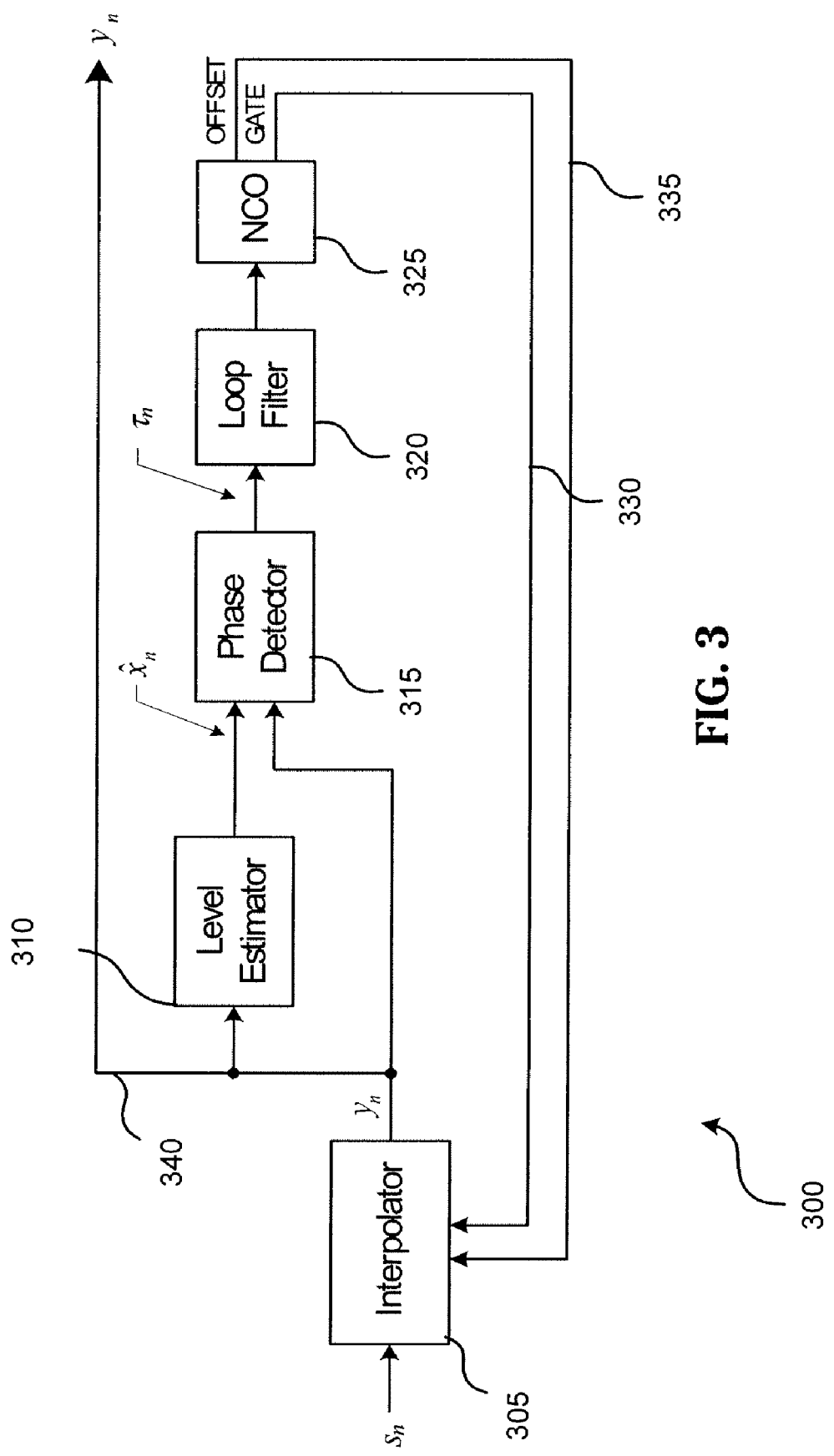
FIG. 3 illustrates an example environment in which a noise prediction filter according to one embodiment of the present invention can be implemented.

Another timing recovery method is interpolative timing recovery, which interpolates to obtain the desired data using an over-sampled data set. FIG. 3 illustrates an example interpolative timing recovery circuit 300 in which an apparatus or method of the present invention can be implemented. Referring now to FIG. 3, the illustrated example circuit 300 includes an interpolator 305, a level estimator 310, a phase detector 315, a filter 320, and a numerically-controlled oscillator (NCO) 325.

Input signals of circuit 300 comprise digitized samples of a playback waveform, suitably shaped and sampled at a rate higher than the cell rate of the waveform. In operation, NCO 325 is clocked by a system clock (not shown) running at a fixed rate higher than the oversampling rate. NCO 325 outputs gating signal 330 at the cell rate of the input data, each of which indicates that an interpolation should be made in the current cycle. The exact point of the interpolation within the cycle is given by an offset signal 335.

As shown in FIG. 3, interpolator 305 uses gating signal 330 and offset signal 335 to generate an interpolated value 340, which is applied to level estimator 310. Interpolated value 340 is also the output of circuit 300, which is subsequently applied to Viterbi detector or other detector. Level estimator 310 determines the nearest ideal signal value to the sample, and its output is applied to the phase detector together with interpolated value 340. Using one of several methods, most commonly the Mueller-Müller method, phase detector 315 determines and outputs an estimate of the timing error, which is the fraction of a cell by which offset leads or lags the ideal sampling instant. The timing error is filtered by loop filter 320 and the result is applied to NCO 325, which uses the output of filter 320 to update its frequency and phase.

Signal 340 typically has two components. The first component is noise and the second is the interpolated value. Noise is inherent in electronic systems and may be caused by various sources such as, for example, variability in semiconductor manufacturing, external interference, or signal coupling. In any case, this noise component is applied to level estimator 310, where it may cause an erroneous estimation, which further introduces noise into downstream calculations and components. For example, the erroneous estimation may cause phase detector 315 to produce a spurious phase error, which adds to the total error of system 300.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 4:
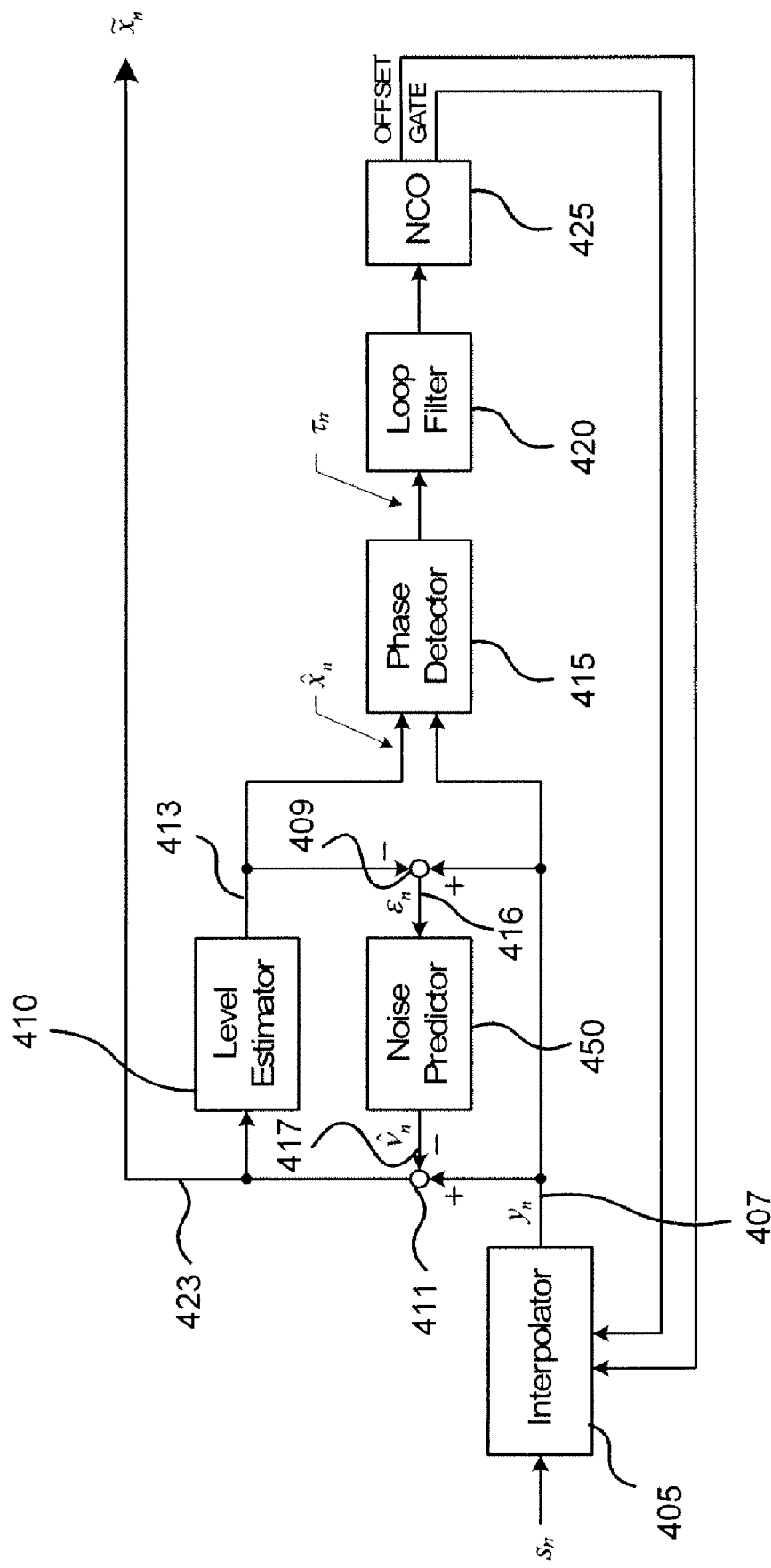
FIG. 4 illustrates an example timing recovery circuit according to one embodiment of the present invention.

FIG. 4 illustrates an example interpolative timing recovery circuit 400 according to one embodiment of the present invention. Referring now to FIG. 4, circuit 400 includes an interpolator 405, a level estimator 410, a phase detector 415, a filter 420, a numerically-controlled oscillator (NCO) 425, a noise predictor 450.

Similar to circuit 300, signals input to circuit 400 are sampled at a rate higher than the cell rate of the waveform. As shown in FIG. 4, interpolator 405 uses a gating signal and an offset signal from NCO 425 to generate an interpolated signal 407, which is mixed with other signals at mixers 409 and 411.

At mixer 409, interpolated signal 407 is added to the output signal 413 of level estimator 410, which is configured to determine the nearest ideal signal value to sample or ideal sample time. Noise predictor 450 uses the output signal 416 of mixer 409 to predict the noise component of signal 407. A noise compensation signal 417 is generated by noise predictor 450 and is mixed with signal 407 at mixer 411. In one embodiment, in the first cycle, signal 417 may be zero or may be a randomly generated value.

The output of mixer 411 is a noise-adapted interpolated value signal 423, which is also the output of circuit 400. Noise-adapted interpolated value 423 is also applied to the input of level estimator 410, which uses the newly compensated interpolated value 423 to generate a new estimate of signal 413.

Phase detector 415 determines and outputs an estimate of the timing error by comparing signal 413 and signal 407. The timing error is the fraction of a cell by which offset leads or lags the ideal sampling instant.

As shown in FIG. 4, loop filter 420 filters the timing error (output of phase detector 415) and the result is applied to NCO 425. In circuit 400, NCO 425 is configured to output a gating signal at the cell rate of the input data, each of which indicates that an interpolation should be made in the current cycle. NCO 425 is also configured to output an offset signal that determine the point of the interpolation within the cycle. The cycle repeats at interpolator 405 when it uses the gating signal and the offset signal 335 to generate a new interpolated value signal 407.

As shown in FIG. 4, circuit 400 incorporates the noise-prediction mechanism to reduce the additive noise component in interpolated signal 407. In one embodiment, the interpolator output is modeled as the succession of samples represented by equation $$y_n = x_n + v_n + a_n, \quad (1)$$

where $x_n$ is the ideal signal level at the cell boundary. $v_n$ is a colored noise sample, and $a_n = f(\tau_n)$ is the signal amplitude as a function of phase error $\tau$ in the region about the sampling instant. The noise component at the input of level estimator 410 may be reduced as follows.

The predicted noise sample $\hat{v}_n$ is subtracted from the input sample, resulting in the signal, represented by equation $$\tilde{x}_n = y_n - \hat{v}_n = x_n + w_n + a_n, \quad (2)$$

where $w_n$ is the residual white noise component. The samples in equation (2) are detected to produce the level estimates $\hat{x}_n$ which are subtracted away from the input, resulting in the signal $\epsilon_n = v_n + a_n$ consisting of the noise component and the phase error amplitude.

Because $a_n$ is small, zero-mean, and weakly correlated, the prediction filter acts principally on $v_n$ to produce the estimates. The detected signal and the whitened signal, represented by equation (2) are provided to the phase detector.

Figure 5:
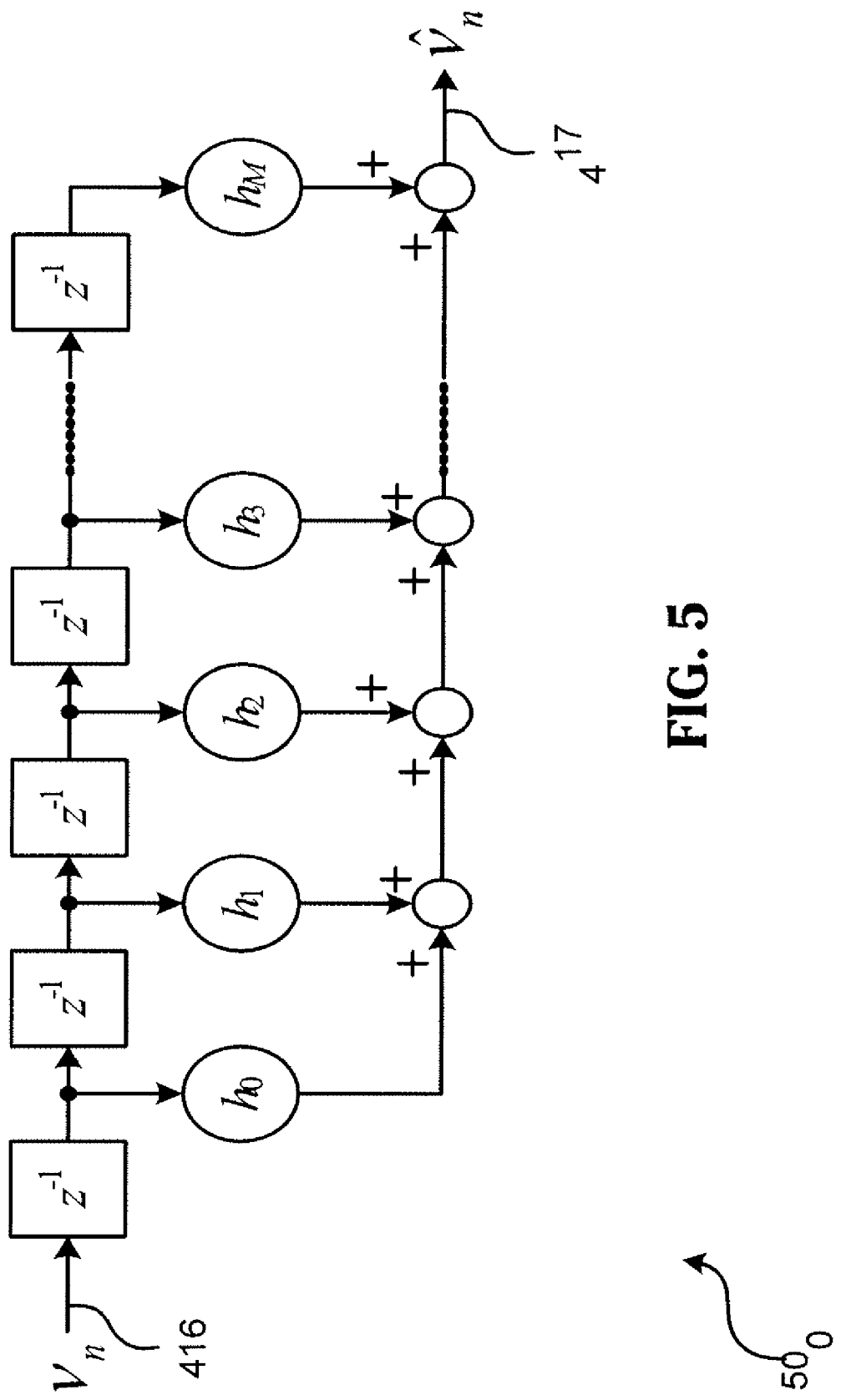
FIG. 5-6 illustrate examples of noise prediction filters according to embodiments of the present invention.

FIG. 5 illustrates an example noise prediction filter 500 according to one embodiment of the present invention. In one embodiment, noise predictor 450 (as shown in FIG. 4) can be implemented using noise prediction filter 500. Filter 500 is a direct finite impulse response (FIR) filter. In general, FIR filters are nonrecursive digital filters. A recursive filter is a filter with output being dependent on previous output values. Whereas, the output of a nonrecursive filter depends only on the present input value.

Referring to FIG. 5, if the characteristics of the noise $v_n$ are known, they may be employed to produce fixed, a priori coefficients $h_i$ (also referred to as filter taps) for the noise predictor. In one embodiment, these coefficients may be pre-determined, randomly generate, or may be look up using a lookup table.

Figure 6:
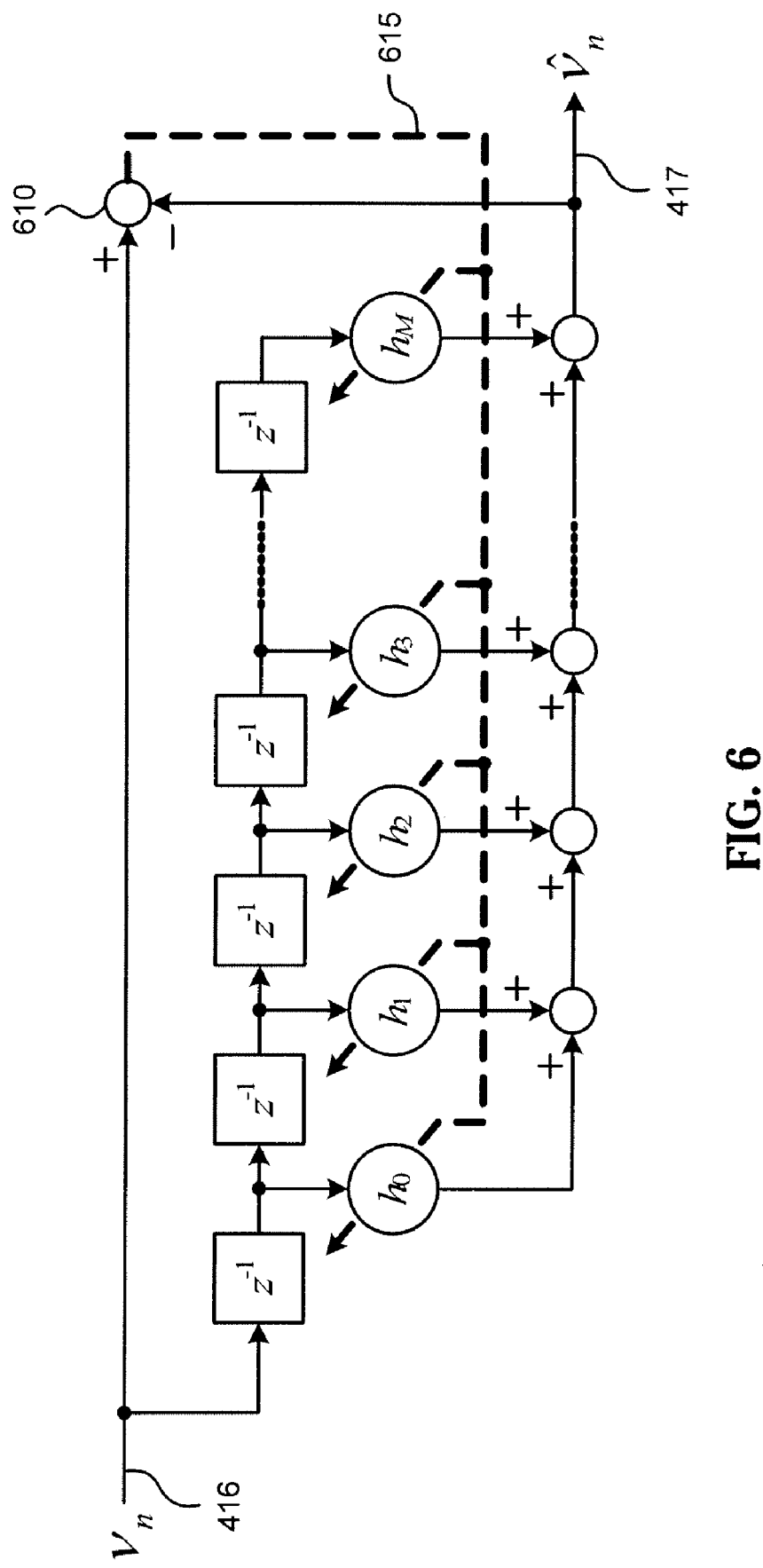

Alternatively, these coefficients can be generated using various adaptive algorithms. FIG. 6 illustrates an example adaptive noise prediction filter 600 according to one embodiment of the present invention. In one embodiment, adaptive filter 600 adjusts the coefficients $h_i$ using adaptive method such as, for example, Widrow-Hoff or stochastic gradient method, to drive the difference between the filter input and its output to zero. This enables filter 600 to track changes in the noise characteristics. Although the example of a direct form filter is used here, it should be apparent that any predictive filter structure could be used. In particular lattice filters have excellent characteristics with respect to coefficient quantization.

As mentioned, filter 600 can be configured to use the Widrow-Hoff LMS adaptive method to determine the tap weights or filter coefficients $h_i$. In one embodiment, the coefficients are randomly calculated in the first cycle. As shown in FIG. 6, signal 416 is mixed with output signal 417 to derive a difference signal 615, which is used to determine each filter coefficient such that the difference between input signal 416 and output signal 417 is driven to zero.

In one embodiment, the Widrow-Hoff method is used to predict each noise sample based on a finite number of previous samples $y_{n-1}, y_{n-2}, \ldots, y_{n-M}$, the estimation error is the difference between the observed current noise sample $y_n$ and the predicted sample $\hat{y}_n$. Given the above, the estimation error can be represented by the equation below, where E is the estimation error, $$\epsilon(h) = E[e_n^2] E[(y_n - \hat{y}_n)^2] = E[y_n^2] - 2E[y_n \hat{y}_n] h + E[y_n^2] h^2. \quad (3)$$

The minimization condition is $$\begin{aligned}\frac{\partial \epsilon(h)}{\partial h} &= 2E\left[e_n \frac{\partial e_n}{\partial h}\right] \\ &= -2E[e_n y_n] \\ &= -2E[y_n \hat{y}_n] + 2E[y_n^2] h \\ &= 0\end{aligned} \quad (4)$$

which (writing the correlations $r = [y_n \hat{y}_n]$ and $R = E[y_n^2]$ in accordance with notational convention) gives the solution $$h = R^{-1} r \quad (5)$$

In the adaptive case, the filter weights h are made time dependent and are updated from one sampling instant to the next by $$h(n+1) = h(n) + \Delta h(n) \quad (6)$$

where Δh(n) is a correction term that must be chosen properly in order to ensure that the time-varying weights h(n) will eventually converge to the optimal value h. The simplest way to choose Δh(n) is to require that the change h→h+Δh must always reduce the estimation error, that is, $$\epsilon(h+\Delta h) \leq \epsilon(h) \tag{7}$$

This is called the gradient-descent method. Assuming that Δh is sufficiently small, we can expand to first order to obtain the condition $$\varepsilon(h) + \Delta h \frac{\partial \varepsilon(h)}{\partial h} \varepsilon(h) \tag{8}$$

which is satisfied by $$\Delta h = -\mu \frac{\partial \varepsilon(h)}{\partial h} \tag{9}$$

where the adaptation parameter μ is chosen small enough to justify keeping only the first order term in the Taylor expansion (8). We therefore choose to update the weights by the gradient $$h(n+1) = h(n) - \mu \frac{\partial \varepsilon(h)}{\partial h}. \tag{10}$$

The adaptation of the weights thus requires knowledge of the correlations R and r in order to find $$\frac{\partial \varepsilon(h)}{\partial h}.$$

These are not available in real time, but we may substitute the Widrow-Hoff or stochastic approximation algorithm. In this method the gradient appearing in (10) is replaced by an instantaneous gradient by ignoring the expection instructions. Thus $$\frac{\partial \varepsilon(h(n))}{\partial h} = -2E[e_n y_n] = -2E[y_n \hat{y}_n] + 2E[y_n^2]h(n) \tag{11}$$

is replaced by $$\frac{\partial \varepsilon(h(n))}{\partial h} = -2e_n y_n = -2y_n \hat{y}_n + 2y_n^2 h(n) \tag{12}$$

leading to the weight-adjustment algorithm $$h(n+1) = h(n) - 2\mu e_n y_n \tag{13}$$

which is causal and realizable.

It should be noted that while the LMS algorithm described above is being implemented in filter 600, other adaptive algorithms could also be used such as, for example, recursive least squares (RLS), fast RLS, and adaptive lattice algorithms.

Figure 7:
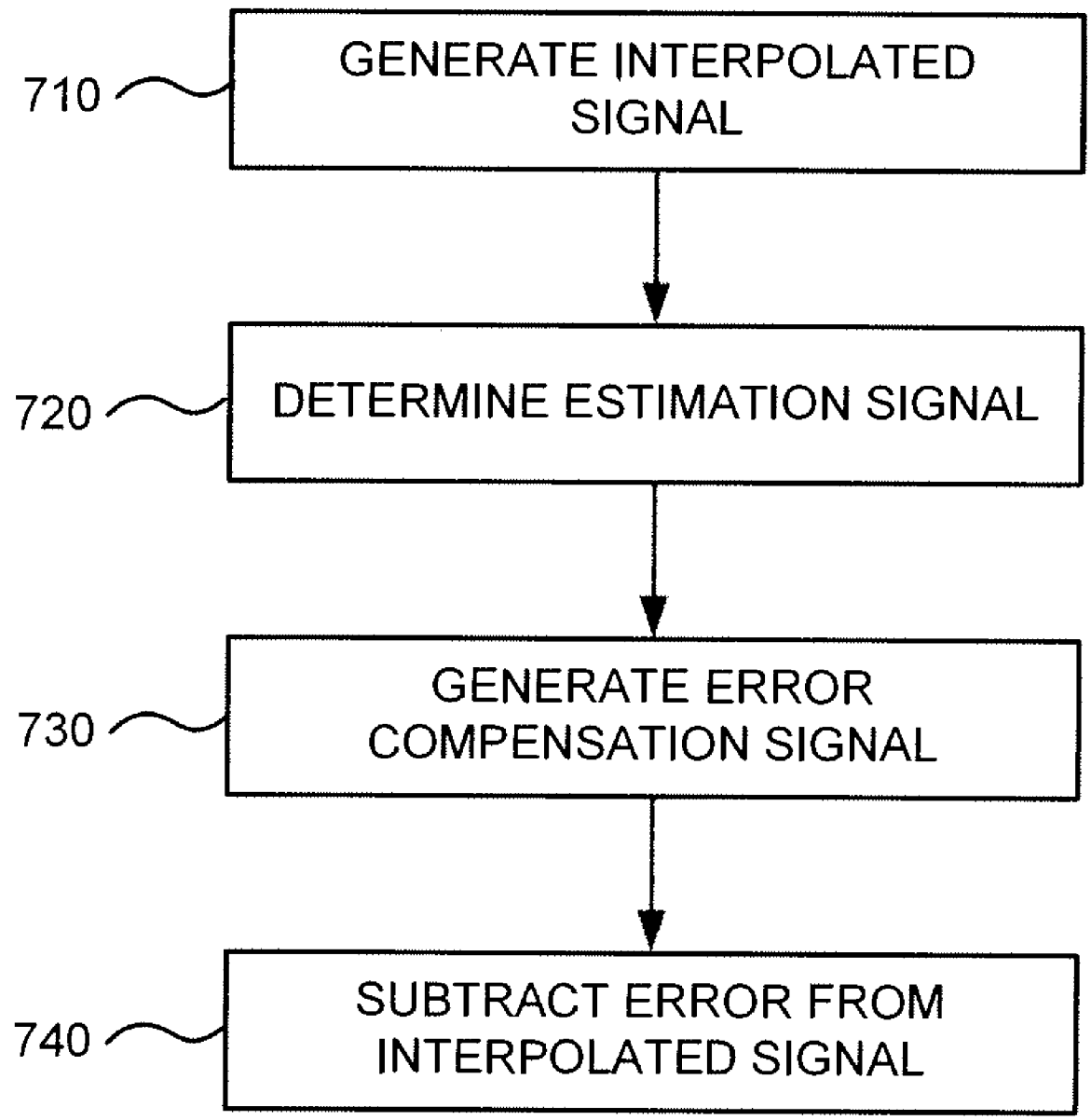
FIG. 7 illustrates an example process flow implemented by a method according to one embodiment of the present invention.

FIG. 7 illustrates a process flow 700 according to one embodiment of the present invention. Referring now to FIG. 7, process flow 700 begins at a step 710 in which an interpolated signal is generated. In one embodiment, the interpolated signal is generated using interpolator 405.

In a step 720, the estimation signal is determined based on the interpolated signal generated at step 710. The estimation signal is used to determine the nearest ideal signal value to sample or ideal sample time. In one embodiment, the estimation signal is generated using level estimator 410.

In a step 730, an error compensation signal is generated. In one embodiment, the error compensation signal is generated using error prediction filter 500 or 600. The error compensation signal is generated by analyzing a difference signal of estimation signal and the interpolated signal. In one embodiment, the error compensation signal is generated by performing an adaptive algorithm such as, for example, Widrow-Hoff or stochastic approximation algorithm on the difference signal.

In a step 740, the error compensation signal is subtracted from the interpolated signal to yield a corrected interpolated signal which is then applied to Viterbi detector at the output. In this way, an accurate timing recovery signal can be achieved.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A timing recovery circuit comprising:
an interpolator configured to generate an interpolated signal;
an estimator configured to generate a first output signal based on the interpolated signal;
a noise prediction filter configured to generate a compensation signal based on interpolated signal and the first output signal;
a first mixer configured to mix the interpolated signal with the first output signal and to output the mixed signal to the noise prediction filter; and
a second mixer configured to mix the compensation signal with the interpolated signal to generate the timing recovery circuit output signal.

2. A timing recovery circuit comprising:
an interpolator configured to generate an interpolated signal;
an estimator configured to generate a first output signal based on the interpolated signal;
a noise prediction filter configured to generate a compensation signal based on interpolated signal and the first output signal;
a phase detector configured to detect a phase error based on the first output signal and the interpolated signal;
a loop filter configured to filter a phase detector output signal and to output a filtered signal; and
an oscillator configured to generate a gate signal and a offset signal based on the filtered signal from the loop filter.

3. A timing recovery circuit comprising:
an interpolator configured to generate an interpolated signal;
an estimator configured to generate a first output signal based on the interpolated signal;
a noise prediction filter configured to generate a compensation signal based on interpolated signal and the first output signal,
wherein the noise prediction filter comprises an adaptive nonrecursive finite impulse response filter.

4. The timing recovery circuit of claim 3, wherein the nonrecursive finite impulse response filter have a plurality of filter taps, each filter tap value is determined using a lookup table.

5. The timing recovery circuit of claim 3, wherein the nonrecursive finite impulse response filter have a plurality of filter taps, each filter tap value is determined using an adaptive algorithm.

6. The timing recovery of claim 5, wherein the adaptive algorithm comprises a Widrow-Hoff LMS algorithm, recursive least squares (RLS), fast RLS, or an adaptive lattice algorithm.

7. The timing recovery of claim 5, wherein the nonrecursive finite impulse response (FIR) filter is configured to drive a difference between an input of the FIR filter and an output of the FIR filter to zero.

8. A timing recovery circuit comprising:
an interpolator configured to generate an interpolated signal;
an estimator configured to generate a first output signal based on the interpolated signal;
a noise prediction filter configured to generate a compensation signal based on interpolated signal and the first output signal,
wherein the first output signal comprises an estimation signal configured to determine the nearest ideal signal value to sample.

9. A method for correcting phase error between an interpolated sample time and an ideal interpolated sample time of a waveform comprising:
generating an interpolated sample time;
generating an estimation signal based on the interpolated sample time;
generating an error compensation signal based on interpolated signal and the estimation signal; and
subtracting the error compensation signal from the interpolated sample time.

10. The method of claim 9, wherein the estimation signal is used to determine the nearest ideal signal value to sample.

11. The method of claim 9, further comprising:
mixing the interpolated signal with the estimation signal, wherein the error compensation signal is generated using the mixed signal;
mixing the error compensation signal with the interpolated signal to obtain a second mixed signal, wherein the second mixed signal is used to the estimation signal.

12. The method of claim 9, further comprising:
determining a phase error based on the estimation signal and the interpolated signal;
filtering the determined phase error; and
generating a gate signal and a offset signal based on the filtered phase error, wherein the gate signal and the offset signal are used to generate the interpolated signal in subsequent cycle.

13. The method of claim 9, wherein the error compensation signal is generated using an adaptive nonrecursive finite impulse response filter.

14. The method of claim 13, wherein the adaptive nonrecursive finite impulse response filter have a plurality of filter taps, each filter tap value is determined using a lookup table.

15. The method of claim 13, wherein the adaptive nonrecursive finite impulse response filter have a plurality of filter taps, each filter tap value is determined using an adaptive algorithm.

16. The method of claim 13, wherein the adaptive algorithm comprises a Widrow-Hoff LMS algorithm, recursive least squares (RLS), fast RLS, or an adaptive lattice algorithm.

17. The method of claim 13, wherein the nonrecursive finite impulse response (FIR) filter is configured to drive a difference between an input of the FIR filter and an output of the FIR filter to zero.

18. A timing recovery system comprising:
means for generating an interpolated sample time;
means for generating an estimation signal based on the interpolated sample time, wherein the estimation signal is configured to determine the nearest ideal signal value to sample,
means for generating an error compensation signal based on interpolated signal and the estimation signal; and
means for subtracting the error compensation signal from the interpolated sample time.

19. The timing recovery system of claim 18, further comprising:means for mixing the interpolated signal with the estimation signal, wherein the error compensation signal is generated using the mixed signal;
means for mixing the error compensation signal with the interpolated signal to obtain a second mixed signal, wherein the second mixed signal is used to the estimation signal.

20. The timing recovery system of claim 18, further comprising:
means for determining a phase error based on the estimation signal and the interpolated signal;
means for filtering the determined phase error; and
means for generating a gate signal and a offset signal based on the filtered phase error, wherein the gate signal and the offset signal are used to generate the interpolated signal in subsequent cycle.

21. The timing recovery system of claim 18, wherein the error compensation signal is generated using an adaptive nonrecursive finite impulse response filter.

22. The timing recovery system of claim 21, wherein the adaptive nonrecursive finite impulse response filter have a plurality of filter taps, each filter tap value is determined using a lookup table.

23. The timing recovery system of claim 21, wherein the adaptive nonrecursive finite impulse response filter have a plurality of filter taps, each filter tap value is determined using an adaptive algorithm.

24. The timing recovery system of claim 23, wherein the adaptive algorithm comprises a Widrow-Hoff LMS algorithm, recursive least squares (RLS), fast RLS, or an adaptive lattice algorithm.

* * * * *